United States Patent
Arimilli et al.

(10) Patent No.: US 6,463,507 B1
(45) Date of Patent: Oct. 8, 2002

(54) LAYERED LOCAL CACHE WITH LOWER LEVEL CACHE UPDATING UPPER AND LOWER LEVEL CACHE DIRECTORIES

(75) Inventors: Ravi Kumar Arimilli, Austin, TX (US); Leo James Clark, Georgetown, TX (US); John Steven Dodson, Pflugerville, TX (US); Guy Lynn Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/340,082

(22) Filed: Jun. 25, 1999

(51) Int. Cl.[7] .............................................. G06F 12/00

(52) U.S. Cl. ....................... 711/122; 711/141; 711/163

(58) Field of Search ................................. 711/122, 118, 711/119, 130, 141, 146, 163

(56) References Cited

U.S. PATENT DOCUMENTS

| | | |
|---|---|---|
| 4,742,454 A | 5/1988 | Robinson et al. |
| 5,247,639 A | 9/1993 | Yamahata |
| 5,418,973 A | 5/1995 | Ellis et al. |
| 5,526,508 A | 6/1996 | Park et al. |
| 5,664,230 A | 9/1997 | Leyrer et al. |
| 5,689,679 A | 11/1997 | Jouppi |
| 5,737,751 A | 4/1998 | Patel et al. |
| 5,745,729 A | 4/1998 | Greenley et al. |
| 5,802,575 A | 9/1998 | Greenley et al. |
| 5,809,530 A | 9/1998 | Samra et al. |
| 5,842,225 A | 11/1998 | Kohn |
| 5,860,095 A | 1/1999 | Iacobovici et al. |
| 5,895,495 A | 4/1999 | Arimilli et al. |
| 5,905,509 A | 5/1999 | Jones et al. |
| 5,930,832 A | 7/1999 | Heaslip et al. |
| 5,940,856 A * | 8/1999 | Arimilli et al. .............. 711/119 |
| 5,940,864 A * | 8/1999 | Arimilli et al. .............. 711/163 |
| 5,943,685 A * | 8/1999 | Arimilli et al. .............. 711/146 |
| 5,946,709 A * | 8/1999 | Arimilli et al. .............. 711/119 |
| 5,963,974 A * | 10/1999 | Arimilli et al. .............. 711/130 |
| 5,978,888 A | 11/1999 | Arimilli et al. |
| 5,983,322 A | 11/1999 | Arimilli et al. |
| 5,996,049 A * | 11/1999 | Arimilli et al. .............. 711/141 |
| 6,018,791 A * | 1/2000 | Armilli et al. .............. 711/141 |
| 6,021,471 A | 2/2000 | Stiles et al. |

(List continued on next page.)

OTHER PUBLICATIONS

Wilson, R.; SGI Launches Superscalar R8000 CPU, Electronic Engineering Times, Jun. 13, 1994; p. 1.

*Primary Examiner*—David Hudspeth
*Assistant Examiner*—Fred F. Tzeng
(74) *Attorney, Agent, or Firm*—Casimer K. Salys; Bracewell & Patterson, L.L.P.

(57) ABSTRACT

A method of improving memory access for a computer system, by sending load requests to a lower level storage subsystem along with associated information pertaining to intended use of the requested information by the requesting processor, without using a high level load queue. Returning the requested information to the processor along with the associated use information allows the information to be placed immediately without using reload buffers. A register load bus separate from the cache load bus (and having a smaller granularity) is used to return the information. An upper level (L1) cache may then be imprecisely reloaded (the upper level cache can also be imprecisely reloaded with store instructions). The lower level (L2) cache can monitor L1 and L2 cache activity, which can be used to select a victim cache block in the L1 cache (based on the additional L2 information), or to select a victim cache block in the L2 cache (based on the additional L1 information). L2 control of the L1 directory also allows certain snoop requests to be resolved without waiting for L1 acknowledgement. The invention can be applied to, e.g., instruction, operand data and translation caches.

14 Claims, 6 Drawing Sheets

U.S. PATENT DOCUMENTS

| | | | |
|---|---|---|---|
| 6,023,746 A | * | 2/2000 | Arimilli et al. .............. 711/118 |
| 6,023,747 A | | 2/2000 | Dodson |
| 6,026,470 A | | 2/2000 | Arimilli et al. |
| 6,065,101 A | | 5/2000 | Gilda |
| 6,073,211 A | | 6/2000 | Cheng et al. |
| 6,076,157 A | | 6/2000 | Borkenhagen et al. |
| 6,085,288 A | | 7/2000 | Arimilli et al. |
| 6,094,711 A | | 7/2000 | Wong |
| 6,115,795 A | | 9/2000 | Gilda et al. |
| 6,122,711 A | | 9/2000 | Mackenthun et al. |
| 6,122,715 A | | 9/2000 | Palanca et al. |
| 6,138,208 A | | 10/2000 | Dhong |
| 6,141,733 A | | 10/2000 | Arimilli et al. |
| 6,145,059 A | | 11/2000 | Arimilli et al. |
| 6,148,371 A | | 11/2000 | Hetherington et al. |
| 6,148,372 A | | 11/2000 | Mehrotra et al. |
| 6,154,812 A | | 11/2000 | Hetherington et al. |

* cited by examiner

LAYERED LOCAL CACHE WITH LOWER LEVEL CACHE UPDATING UPPER AND LOWER LEVEL CACHE DIRECTORIES

CROSS-REFERENCES TO RELATED APPLICATIONS

The present invention is related to the following applications filed concurrently with this application: U.S. patent application Ser. No. 09/340,077 entitled "QUEUE-LESS AND STATE-LESS LAYERED LOCALDATA CACHE MECHANISM"; U.S. patent application Ser. No. 09/340,076 entitled "LAYERED LOCAL CACHE MECHANISM WITH SPLIT REGISTER LOAD BUS AND CACHE LOAD BUS"; U.S. patent application Ser. No. 09/340,075 entitled "LAYERED LOCAL CACHE WITH IMPRECISE RELOAD MECHANISM"; U.S. patent application Ser. No. 09/340,074 entitled "LAYERED LOCAL CACHE WITH LOWER LEVEL CACHE OPTIMIZING ALLOCATION MECHANISM"; U.S. patent application Ser. No. 09/340,073 entitled "METHOD FOR UPPER LEVEL CACHE VICTIM SELECTION MANAGEMENT BY A LOWER LEVEL CACHE"; U.S. patent application Ser. No. 09/340,078 entitled "HIGH PERFORMANCE STORE INSTRUCTION MANAGEMENT VIA IMPRECISE LOCAL CACHE UPDATE MECHANISM"; U.S. patent application Ser. No. 09/340,079 entitled "HIGH PERFORMANCE LOAD INSTRUCTION MANAGEMENT VIA SYSTEM BUS WITH EXPLICIT REGISTER LOAD AND/OR CACHE RELOAD PROTOCOLS"; U.S. patent application Ser. No. 09/340,080 entitled "METHOD FOR LAYERING LOCAL INSTRUCTION CACHE MANAGEMENT"; and U.S. patent application Ser. No. 09/340,081 entitled "METHOD FOR LAYERING LOCAL TRANSLATION CACHE MANAGEMENT".

BACKGROUND OF THE INVENTION

1. Field of the Invention

The present invention generally relates to computer systems, and more specifically to an improved method of accessing memory values (operand data or instructions) used by a processor of a computer system. In particular, the present invention makes more efficient use of a multi-level cache hierarchy, and ports values directly to, e.g., a rename register, instruction buffer, or translation table of the processor without the need for load queues or reload buffers in high level caches.

2. Description of Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

The objective of superscalar architecture is to employ parallelism to maximize or substantially increase the number of program instructions (or "micro-operations") simultaneously processed by the multiple execution units during each interval of time (processor cycle), while ensuring that the order of instruction execution as defined by the programmer is reflected in the output. For example, the control mechanism must manage dependencies among the data being concurrently processed by the multiple execution units, and the control mechanism must ensure that integrity of sequentiality is maintained in the presence of precise interrupts and restarts. The control mechanism preferably provides instruction deletion capability such as is needed with instruction-defined branching operations, yet retains the overall order of the program execution. It is desirable to satisfy these objectives consistent with the further commercial objectives of minimizing electronic device count and complexity.

An illustrative embodiment of a conventional processing unit for processing information is shown in FIG. 1, which depicts the architecture for a PowerPC™ microprocessor 12 manufactured by International Business Machines Corp. (IBM—assignee of the present invention). Processor 12 operates according to reduced instruction set computing (RISC) techniques, and is a single integrated circuit superscalar microprocessor. As discussed further below, processor 12 includes various execution units, registers, buffers, memories, and other functional units, which are all formed by integrated circuitry.

Processor 12 is coupled to a system bus 20 via a bus interface unit BIU 30 within processor 12. BIU 30 controls the transfer of information between processor 12 and other devices coupled to system bus 20 such as a main memory 18. Processor 12, system bus 20, and the other devices coupled to system bus 20 together form a host data processing system. Bus 20, as well as various other connections described, include more than one line or wire, e.g., the bus could be a 32-bit bus. BIU 30 is connected to a high speed instruction cache 32 and a high speed data cache 34. A lower level (L2) cache (not shown) may be provided as an intermediary between processor 12 and system bus 20. An L2 cache can store a much larger amount of information (instructions and operand data) than the on-board caches can, but at a longer access penalty. For example, the L2 cache may be a chip having a storage capacity of 512 kilobytes, while the processor may be an IBM PowerPC™ 604-series processor having on-board caches with 64 kilobytes of total storage. A given cache line usually has several memory words, e.g., a 64-byte line contains eight 8-byte words.

The output of instruction cache 32 is connected to a sequencer unit 36 (instruction dispatch unit). In response to the particular instructions received from instruction cache 32, sequencer unit 36 outputs instructions to other execution circuitry of processor 12, including six execution units, namely, a branch unit 38, a fixed-point unit A (FXUA) 40, a fixed-point unit B (FXUB) 42, a complex fixed-point unit (CFXU) 44, a load/store unit (LSU) 46, and a floating-point unit (FPU) 48.

The inputs of FXUA 40, FXUB 42, CFXU 44 and LSU 46 also receive source operand information from general-purpose registers (GPRs) 50 and fixed-point rename buffers 52. The outputs of FXUA 40, FXUB 42, CFXU 44 and LSU 46 send destination operand information for storage at selected entries in fixed-point rename buffers 52. CFXU 44 further has an input and an output connected to special-purpose registers (SPRs) 54 for receiving and sending source operand information and destination operand information, respectively. An input of FPU 48 receives source operand information from floating-point registers (FPRs) 56 and floating-point rename buffers 58. The output of FPU 48 sends destination operand information to selected entries in floating-point rename buffers 58.

As is well known by those skilled in the art, each of execution units 38–48 executes one or more instructions within a particular class of sequential instructions during each processor cycle. For example, FXUA 42 performs fixed-point mathematical operations such as addition, substraction, ANDing, ORing, and XORing utilizing source operands received from specified GPRs 50. Conversely, FPU 48 performs floating-point operations, such as floating-point multiplication and division, on source operands received from FPRs 56. As its name implies, LSU 46 executes floating-point and fixed-point instructions which either load operand data from memory (i.e., from data cache 34) into selected GPRs 50 or FPRs 56, or which store data from selected GPRs 50 or FPRs 56 to memory 18.

Processor 12 may include other registers, such as configuration registers, memory management registers, exception handling registers, and miscellaneous registers, which are not shown. Processor 12 carries out program instructions from a user application or the operating system, by routing the instructions and operand data to the appropriate execution units, buffers and registers, and by sending the resulting output to the system memory device (RAM), or to some output device such as a display console.

Register sets such as those described above limit superscalar processing, simply due to the number of registers that are available to a particular execution unit at the beginning of instruction execution (i.e., the registers must be shared among the different execution units). Moreover, superscalar operations are typically "pipelined," that is, a plurality of processing stages are provided for a given execution unit, with each stage able to operate on one instruction at the same time that a different stage is operating on another instruction, so the registers must be further shared. The problem is exacerbated when a long sequence of instructions requires access to the same register set. Furthermore, programmers often use the same registers as temporary storage registers rather than moving data to and from system memory (since the latter process takes a large amount of time relative to processor speed), so a small register set can cause a "bottleneck" in the performance stream. Techniques have been devised for expanding the effective number of available registers, such as: by providing register renaming (using rename buffers 52 and 58). Register renaming provides a larger set of registers by assigning a new physical register every time a register (architected) is written. A physical register is released for re-use when an instruction that overwrites the architected state maintained in that register completes.

One problem with conventional processing is that operations are often delayed as they must be issued or completed using queues or buffers. For example, when the processor executes a load instruction (via load/store unit 46), the data (L1) cache 34 is first examined to see if the requested memory block is already in the cache. If not (a "cache miss"), the load operation will be entered into a load queue (not shown) of the cache. The load queue severely limits the number of outstanding loads that can be pending in the system. Typically, there are only two or three entries in the load queue, as most systems rely on the assumption that the majority of accesses will be for operand data that is already in the L1 cache (cache "hits"). If the load queue is already full and another cache miss occurs, the processor core stalls until an entry in the queue becomes available.

Several other processing delays are associated with the operation of, or interaction with, the caches, particularly the L1 cache. For example, on a cache miss with a set associative cache, it is necessary to select a cache line in a particular set of the cache for use with the newly requested data (a process referred to as eviction or victimization) The request cannot be passed down to the lower storage subsystem until a victim is chosen. If the chosen victim has been previously modified (the object of a store operation), then the modified value must be aged out (cast out). The logic unit used to select the victim, such as a least-recently (or less recently) used (LRU) algorithm, must also be updated in the L1 cache. These steps are located in the critical path of processor core execution.

Similarly, a reload buffer (not shown) is used to temporarily hold values before they are written to the L1 cache to handle cache read/write collisions. When the lower level memory hierarchy supplies the value requested by a load operation, the response (operand data and address) first enters the reload buffer.

Delays may likewise occur for store (write) operations. which use a store queue. These types of delays can also arise with operations whose targets are other than register renames, such as instruction fetch units, or translation tables requesting addresses. Translation tables commonly used in processors include translation lookaside buffers which convert physical addresses to virtual addresses (for either instructions or operand data, i.e., ITLBs and DTLBs), or effective-to-real address tables (ERATs).

An additional delay is presented by the requirement that the entire cache line be received by the L1 cache prior to passing the critical value on to the appropriate element within the processor (e.g., to a register rename buffer, translation lookaside buffer, or instruction dispatch unit).

In fact, the entire cache line of, say, 64 bytes must be loaded into the L1 cache even though the processor only requested an 8-byte word (the L1 cache controller provides the smaller granularity on the processor output side).

As noted above, a cache line victim representing modified data must be written to the lower levels of the memory hierarchy; this is true for a "write-back" cache, where data values are not immediately passed on to the remainder of the memory hierarchy after a store operation. Caches can also be "write-through," but this leads to increased demands on bus bandwidth. Write-back caches use state information bits to maintain consistency within the overall memory hierarchy (coherency), combined with the monitoring (snooping) of memory operations. One example of the state information is that supplied by the "MESI" cache coherency protocol, wherein a cache line can be in one of four coherency states: Modified, Exclusive, Shared or Invalid. Cache coherency protocols introduce further complexities and requirements into the interaction of the caches.

In light of the foregoing, it would be desirable to provide a method of speeding up core processing by improving the operation of the caches, particularly the L1 cache. It would be particularly advantageous if the method could provide values (instructions or operand data) more directly to processor components, i.e., without requiring the use of so many intervening queues and buffers, and allow more flexibility in the interaction between a cache and a processor or between vertically adjacent caches (e.g., L1 and L2) in a multi-cache hierarchy.

SUMMARY OF THE INVENTION

It is therefore one object of the present invention to provide an improved data processing system having one or more local caches in the memory hierarchy.

It is another object of the present invention to provide such an improved data processing system having a multi-level cache structure, and at least one layered cache wherein one or more cache functions are handled by a lower level cache.

It is yet another object of the present invention to provide a memory structure for a computer system which speeds up memory accesses by removing or distancing cache functions from the critical path of core execution.

The foregoing objects are achieved in a method of communicating with a multi-level cache of a computer system, comprising the steps of issuing a request from a first device of the computer system to gain ownership of a target memory block located in a memory device of the computer system, determining that a copy of the target memory block is located in an upper level cache associated with a second device of the computer system, and responding to the request using a lower level cache associated with the second device, without any acknowledgement from the upper level cache. The response may be, e.g., a "clean" response to the first device. In the illustrative embodiment in which the computer system is a multi-processor computer system (the first device is a first processor, and the second device is a second processor), the request is transmitted from the first device to the lower level cache of the second processor across a system bus. The request may result from, e.g., a kill instruction for the target memory block or a flush instruction for the target memory block. If inclusivity is maintained between the upper level and lower level caches, the determination that the copy of the target memory block is located in the upper level cache is accomplished by simply searching a directory of the lower level cache. The upper level cache is updated by the lower level cache.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
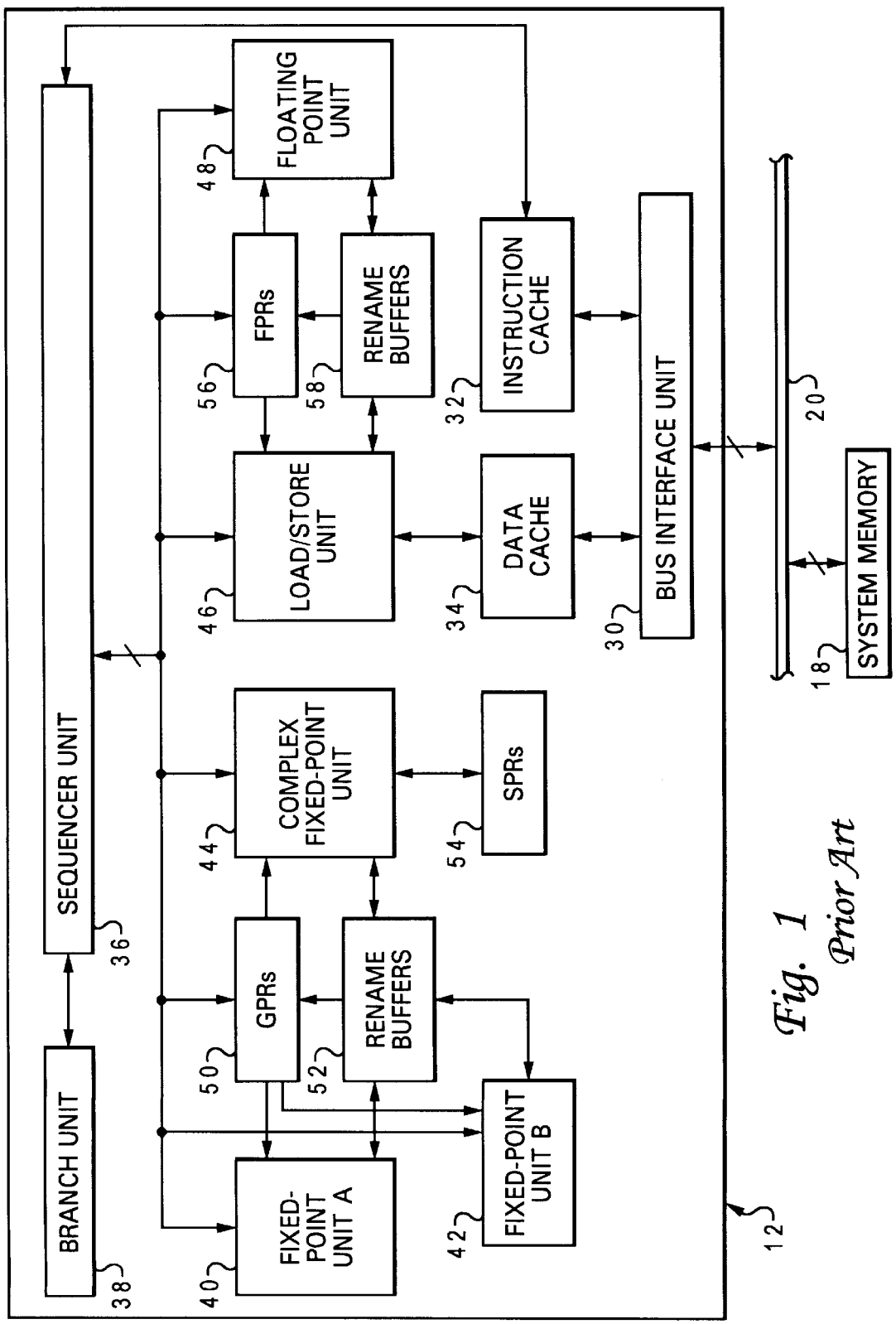
FIG. 1 is a block diagram of a conventional superscalar computer processor, depicting execution units, buffers, registers, and the on-board (L1) data and instruction caches.
Figure 2:
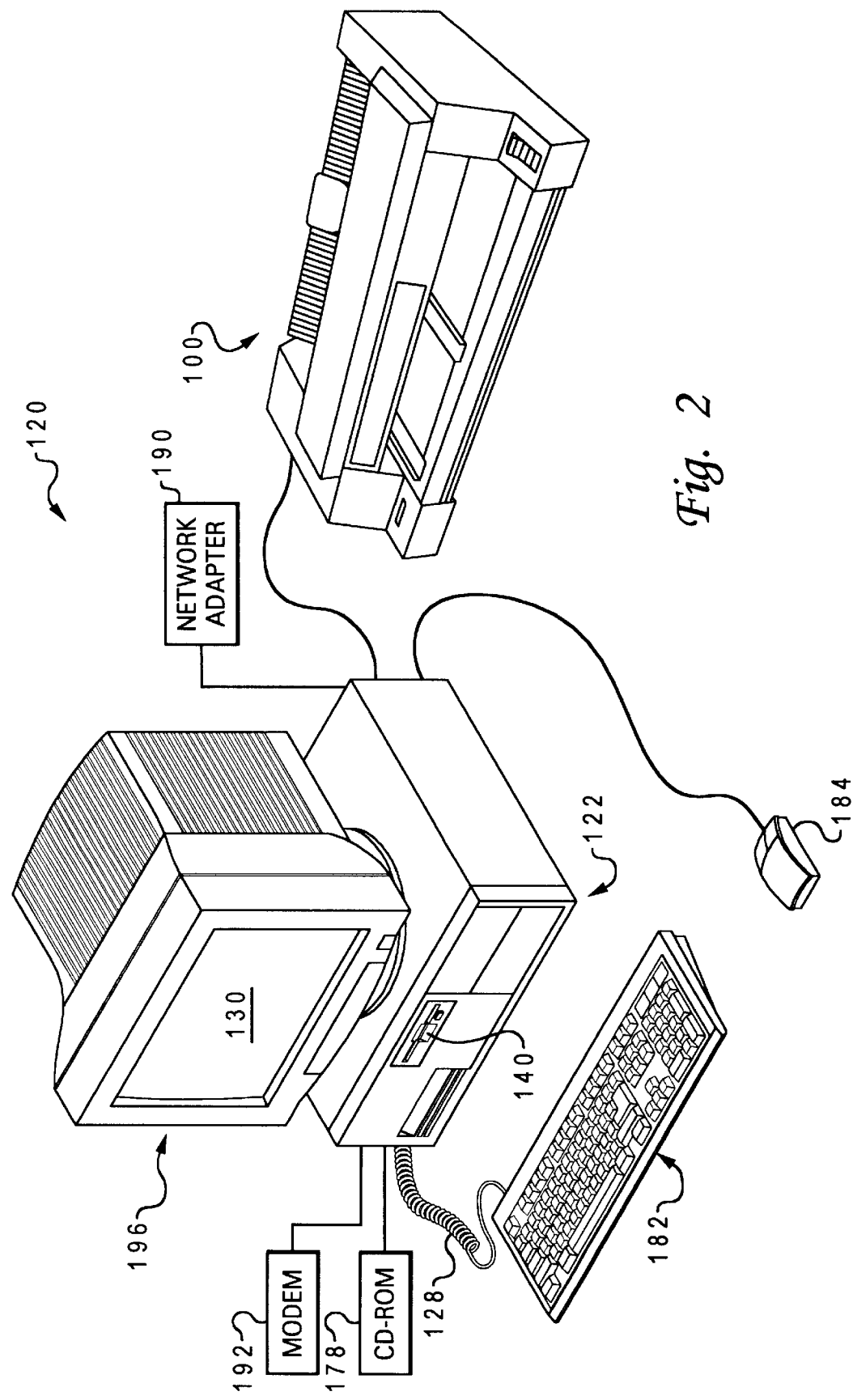
FIG. 2 is an illustration of one embodiment of a data processing system in which the present invention can be practiced.

With reference now to the figures, and in particular with reference to FIG. 2, a data processing system 120 is shown in which the present invention can be practiced. The data processing system 120 includes processor 122, keyboard 182, and display 196. Keyboard 182 is coupled to processor 122 by a cable 128. Display 196 includes display screen 130, which may be implemented using a cathode ray tube (CRT), a liquid crystal display (LCD), an electrode luminescent panel or the like. The data processing system 120 also includes pointing device 184, which may be implemented using a track ball, a joy stick, touch sensitive tablet or screen, track path, or as illustrated a mouse. The pointing device 184 may be used to move a pointer or cursor on display screen 130. Processor 122 may also be coupled to one or more peripheral devices such a modem 192, CD-ROM 178, network adapter 190, and floppy disk drive 140, each of which may be internal or external to the enclosure or processor 122. An output device such as a printer 100 may also be coupled with processor 122.

It should be noted and recognized by those persons of ordinary skill in the art that display 196, keyboard 182, and pointing device 184 may each be implemented using any one of several known off-the-shelf components.

Figure 3:
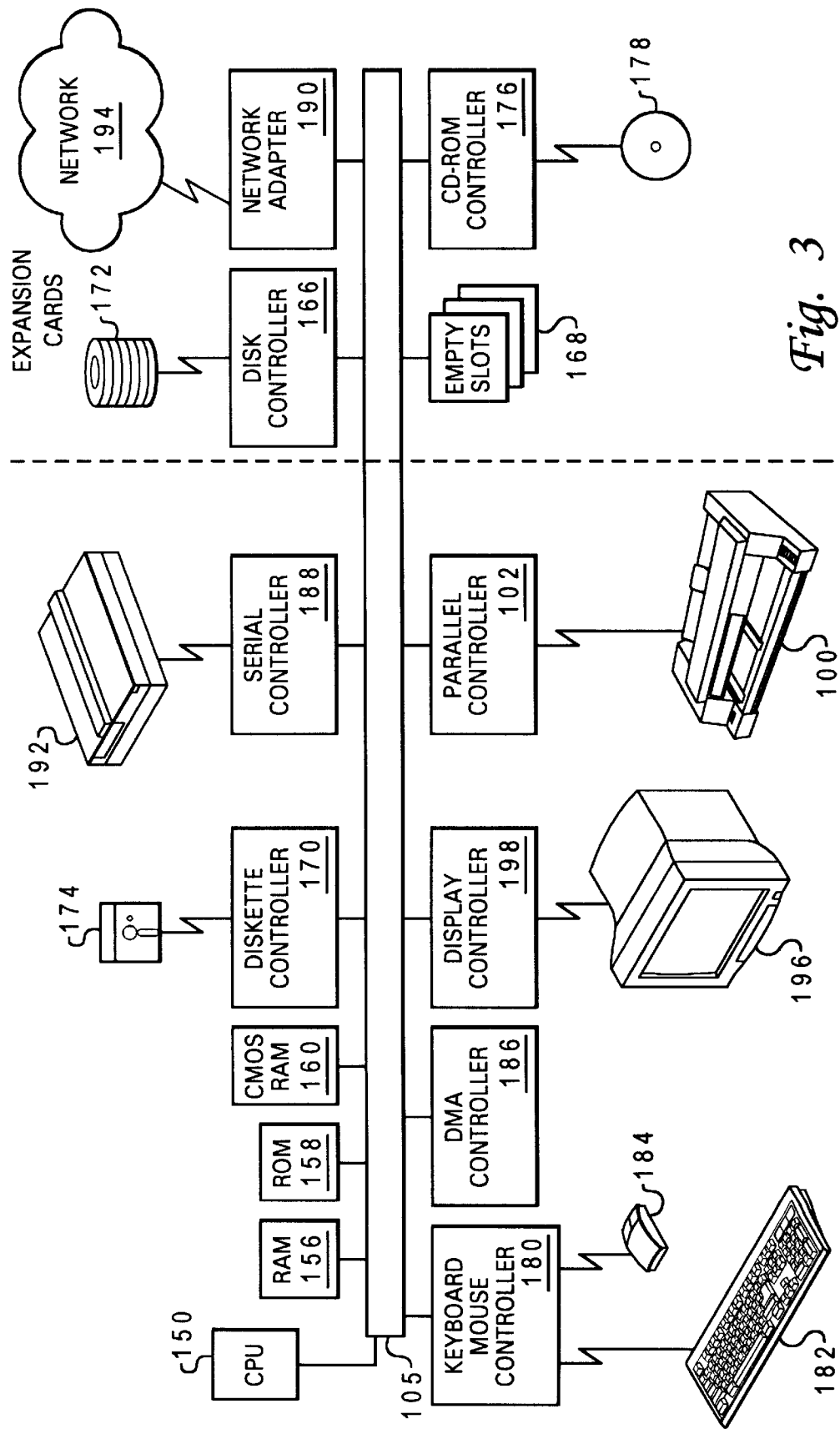
FIG. 3 is a block diagram illustrating selected components that can be included in the data processing system of FIG. 2 according to the teachings of the present invention.

Reference now being made to FIG. 3, a high level block diagram is shown illustrating selected components that can be included in the data processing system 120 of FIG. 2 according to the teachings of the present invention. The data processing system 120 is controlled primarily by computer readable instructions, which can be in the form of software, wherever, or by whatever means such software is stored or accessed. Such software may be executed within the Central Processing Unit (CPU) 150 to cause data processing system 120 to do work.

Memory devices coupled to system bus 105 include Random Access Memory (RAM) 156, Read Only Memory (ROM) 158, and nonvolatile memory 160. Such memories include circuitry that allows information to be stored and retrieved. ROMs contain stored data that cannot be modified. Data stored in RAM can be changed by CPU 150 or other hardware devices. Nonvolatile memory is memory that does not lose data when power is removed from it. Nonvolatile memories include ROM, EPROM, flash memory, or battery-pack CMOS RAM. As shown in FIG. 3, such battery-pack CMOS RAM may be used to store configuration information.

An expansion card or board is a circuit board that includes chips and other electronic components connected that adds functions or resources to the computer. Typically, expansion cards add memory, disk-drive controllers 166, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 168 may be used to receive various types of expansion cards or PCMCIA cards.

Disk controller 166 and diskette controller 170 both include special purpose integrated circuits and associated circuitry that direct and control reading from and writing to hard disk drive 172, and a floppy disk or diskette 74, respectively. Such disk controllers handle tasks such as positioning read/write head, mediating between the drive and the CPU 150, and controlling the transfer of information to and from memory. A single disk controller may be able to control more than one disk drive.

CD-ROM controller 176 may be included in data processing 120 for reading data from CD-ROM 178 (compact disk read only memory). Such CD-ROMs use laser optics rather than magnetic means for reading data.

Keyboard mouse controller 180 is provided in data processing system 120 for interfacing with keyboard 182 and pointing device 184. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 120 and other data processing systems may be facilitated by serial controller 188 and network adapter 190, both of which are coupled to system bus 105. Serial controller 188 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 192. A modem is a communication device that enables a computer to transmit information over standard telephone lines. Modems convert digital computer signals to interlock signals suitable for communications over telephone lines. Modem 192 can be utilized to connect data processing system 120 to an on-line information service or an Internet service provider. Such service providers may offer software that can be down loaded into data processing system 120 via modem 192. Modem 192 may provide a connection to other sources of software, such as a server, an electronic bulletin board (BBS), or the Internet (including the World Wide Web).

Network adapter 190 may be used to connect data processing system 120 to a local area network 194. Network 194 may provide computer users with means of communicating and transferring software and information electronically. Additionally, network 194 may provide distributed processing, which involves several computers in the sharing of workloads or cooperative efforts in performing a task. Network 194 can also provide a connection to other systems like those mentioned above (a BBS, the Internet, etc.).

Display 196, which is controlled by display controller 198, is used to display visual output generated by data processing system 120. Such visual output may include text, graphics, animated graphics, and video. Display 196 may be implemented with CRT-based video display, an LCD-based flat panel display, or a gas plasma-based flat-panel display. Display controller 198 includes electronic components required to generate a video signal that is sent to display 196.

Printer 100 may be coupled to data processing system 120 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 105 and another parallel communication device, such as a printer 100.

CPU 150 fetches, decodes, and executes instructions, and transfers information to and from other resources via the computers main data-transfer path, system bus 105. Such a bus connects the components in a data processing system 120 and defines the medium for data exchange. System bus 105 connects together and allows for the exchange of data between memory units 156, 158, and 160, CPU 150, and other devices as shown in FIG. 3. Those skilled in the art will appreciate that a data processing system constructed in accordance with the present invention may have multiple components selected from the foregoing, including even multiple processors.

Figure 4:
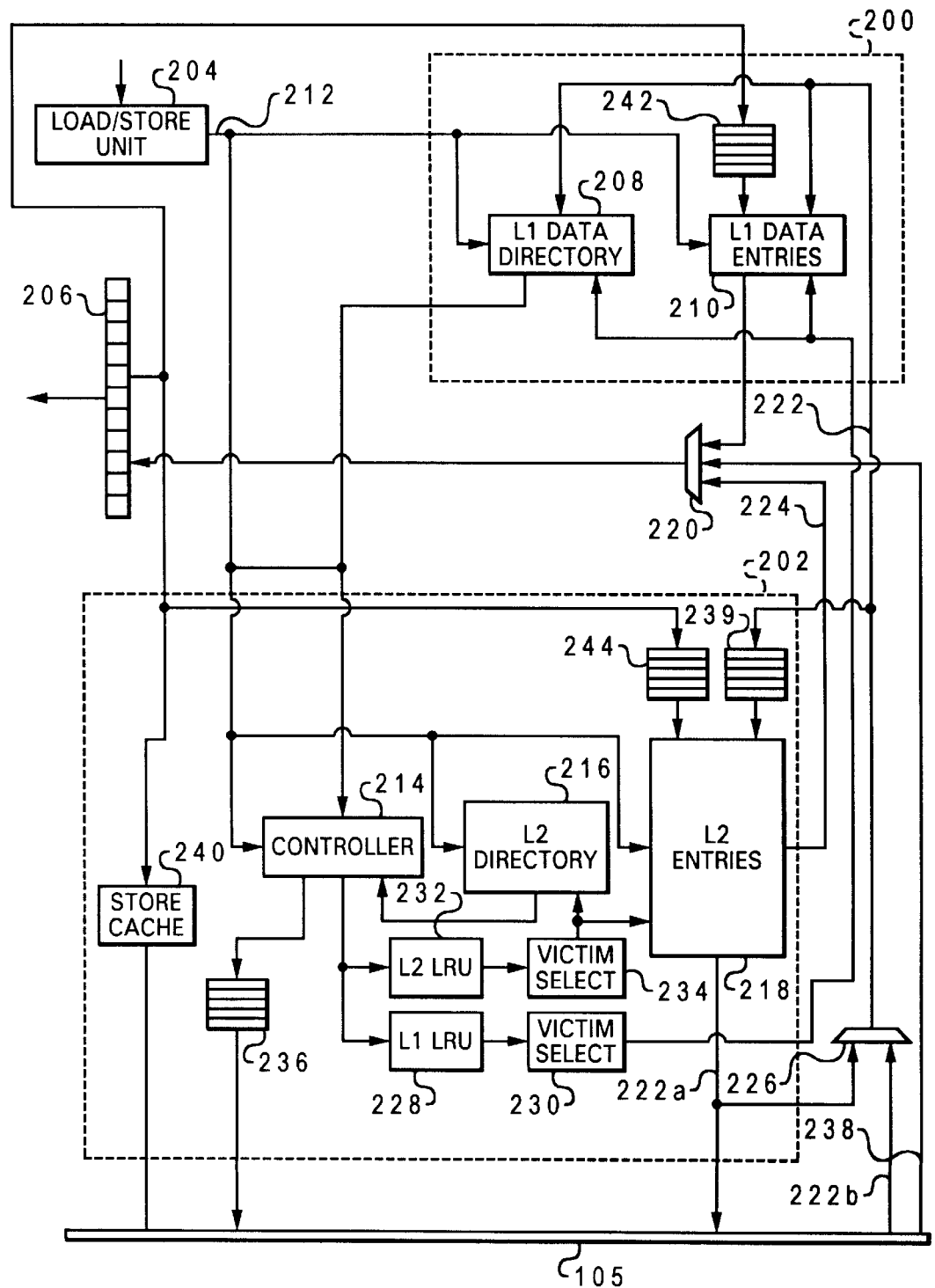
FIG. 4 is a block diagram of a processing unit constructed in accordance with one embodiment of the present invention, depicting operation of a cache structure which includes an L1 operand data cache.

Referring now to FIG. 4, one embodiment of the present invention allows data processing system 120 to more efficiently process information by speeding up the memory accesses performed by CPU 150. In the illustrative embodiment, CPU 150 includes a multi-level cache hierarchy comprised of an upper, or L1 cache 200, and a lower, or L2 cache 202. Also depicted are a load/store unit 204, and a plurality of register renames 206. CPU 150 includes other (conventional) components not shown, such as fixed-point units, floating-point units, branch units, general purpose registers, special purpose registers, etc., some of which are interconnected with load/store unit 204 and register renames 206. L1 cache 200 includes both operand data and instruction caches, although only the operand data components are shown. Those components include the L1 data directory 208 and the L1 data entry array 210.

Noticeably absent in the L1 cache is any load queues (for requests from load/store unit 204), and any reload buffers (for data provided to L1 data entry array from L2 cache 202 or system bus 105). Any request for a load operation is sent along request bus 212 to L1 data directory 208 and L1 data entry array 210. Directory 208 searches to see if the requested address matches one already present (an L1 hit). If the operation results in a cache hit, then the mechanism proceeds as in the prior art, with the read data being sourced by entry array 210 to one of the register renames 206 via a controller or multiplexer 220.

If the load operation results in a miss, however, the load address that is coming out of request bus 212 is also being piped out to the lower level storage subsystem, specifically, to an L2 controller 214, L2 directory 216, and L2 entry array 218 (as explained further below, the requested address is delivered to the L2 components even if the load operation resulted in an L1 hit). This interconnection between request bus 212 and the L2 components lacks any load queues, which allows load/store unit 204 to issue several sequential load operations without generating a stall condition for the core, as would happen in the prior art. Instead of load queues, the present invention handles L1 misses by passing down other information to L2 cache 200, which allows for the later placement of the requested data in the appropriate register rename 206.

Each load operation has a "home" in one of the register renames, i.e., the target register rename, and this specific register rename is identified in the information passed down to L2 cache 202 with the load request. This information is then mirrored back to L1 cache 200 when the data becomes available. For example, consider a load operation designating that data being loaded into logical register 12 (R12). R12 is a logical register, but is also a physical register, so other information is passed to completely identify the dispatch. L2 cache 202 does not use the information, but serves only to mirror the information back to L1 cache 200. When the data is received by L1 cache 200, the associated dispatch information mirrored back is used to place the data in the proper register rename. This mirrored bus protocol allows for more compact CPU cores which lends itself to higher frequencies implementation and more space for other features. L2 controller 214 resolves any L1 collision's.

In the specific implementation of FIG. 4,, two separate ports are provided from L2 cache 202 to L1 cache 200. A first port and associated reload buses 222 and 222a are provided for the entire cache line (e.g., 64 bytes of data), while a second port and associated register bus 224 are provided for the smaller (e.g., 8-byte) word that was specifically requested by the load operation. A single port could be used at L2 entry array 218 instead, with the target data being tapped off to form the second bus. Reload bus 222a is connected to L1 cache 200 via another multiplexer 226, while register bus 224 is connected to register renames 206 via multiplexer 220. Thus, upon an L1 cache miss, if the requested data is present in L2 cache 202, it can be directly ported to register rename 206 via register bus 224 without first having to wait for the entire cache line to be received by the L1 entry array 210. Each register rename is provided with a flag that gets validated once the target data is loaded.

As mentioned above, the load requests are always delivered to L2 cache 202, whether or not the L1 cache missed. In order to allow the L2 cache to determine whether it needs to honor the request, a flag is provided to L2 controller 214 from L1 data directory 208 to indicate the hit/miss status.

In this manner, even if the core is executing an excessive number of sequential or nearly sequential load operations, there is no stalling as the load request is simply piped downstream, and then the data is piped back up to the register renames. Once the register rename flag is validated, any ensuing dependencies on that register rename may proceed. This approach effectively provides what looks like an infinite load queue from the core's perspective. Those skilled in the art will appreciate that this approach is further facilitated by providing an increased number of register renames, e.g., 128 physical registers (logically only 32 are provided in the instruction set).

Providing two separate ports also allows for the "imprecise" operation of L1 cache 200 meaning that, while the specific piece of 8-byte data must be loaded into the register rename, it is not necessary to load the entire 64-byte line. While it makes some sense to reload that data in L1 cache 200, because that cache is closest to the processor core, the mechanism of reloading from L2 to L1 is a separate side behavior which does not hold up the core. In the illustrative embodiment, the imprecise nature of the L1 cache operation is twofold. First, L2 cache 202 may choose to not reload L1 cache 200. Second, L1 cache 200 may refuse to accept a reload that has been proffered from L2 cache 202. Generally, the reload will occur whenever a determination is made that it would be efficient to currently load the cache line into the upper level.

There are several situations where it would be beneficial to not reload the entire cache line. There may be an insufficient amount of queues in the L2 controller to allow the reload (reload queues require relatively large buffers, and many of them). Also, oftentimes there may be many reload requests which hit in the L2 cache. When these requests are contending for the reload bus with data being returned from a lower level of the memory hierarchy for a previous L2 miss, it is often more efficient to not reload one or the other of the requests. This approach simplifies the reload bus pipeline control logic, which leads to higher frequency implementations. L1 cache misses are monitored using the flag that is provided by L1 directory 208 to L2 controller 214 to indicate the hit/miss status. The L2 cache may thus maintain a history of L1 cache misses. The L1 cache hit/miss information is used to update the L2 victim selection state.

Even if the L2 cache directs a reload of data into the L1 cache, the L1 cache may still refuse the reload. For example, load/store unit 204 may be attempting a read operation at the same time that the L2 cache is trying to reload the data into the L1 cache. In such a case, L1 cache 200 may elect to ignore the reload operation and proceed with the read, so as not to stall the core or subsequent reload requests. Thus, the reload mechanism is not only imprecise, it is also out of the critical path of processor core execution.

Further layering of the L1 cache may be achieved by allowing the L2 to control the L1 victimization process. For example, L1 cache 200 may be 8-way set associative, and L2 cache 202 explicitly picks the victim and set for the reload, using an L1 least recently used (LRU) unit 228 and victim select logic 230 controlled by L2 controller 214. This approach has the added benefit of more easily maintaining inclusivity. It also moves the victimization process further away from the critical path. Moreover, since L2 controller 214 sees all of the L1 load addresses, it can maintain a hybrid L2 LRU 232 which includes information based on not only L1 misses, but further on L1 hits; such information would not be available to the L2 LRU unit in the prior art. L2 victim select logic 234 uses the information from hybrid L2 LRU 232.

Another advantage in having the L2 cache control the updating of the L1 cache, is that certain snoop requests can resolve faster, as they do not require an acknowledgement from the L1 cache. For example, the PowerPC instruction set provides several commands that allow a device to gain ownership of a memory block. These commands often result when a device issues a read-with-intent-to-modify (RWITM) instruction. The PowerPC flush instructions (e.g., data cache block flush—"DCBF") cause a cache block to be made available by invalidating the cache block if it contains an unmodified ("shared" or "exclusive") copy of a memory block or, if the cache block contains a modified copy of a memory block, then by first writing the modified value downward in the memory hierarchy (a "push"), and thereafter invalidating the block. The kill instructions (data cache block invalidate—"DCBI," instruction cache block invalidate—"ICBI," or data cache block set to zero—"DCBZ") are similar to the flush instructions except that a kill instruction immediately forces a cache block to an invalidate state, so any modified block is killed without pushing it out of the cache. For these instructions, the prior art requires that the L1 cache acknowledge to the L2 cache when the operation was completed by the L1 cache. In the present invention, however, the invalidate request is guaranteed to occur, since L1 directory writes (invalidates) are controlled explicitly by the L2 cache, so no handshaking between the caches is necessary, and the L2 may immediately send a "clean" (or "null") response to the requesting device. The result is deeply-pipelined, no-acknowledge control flow.

Still another advantage of the foregoing construction is that the L1 cache may be a store-through (write-through) cache, simplifying state information. Only one state bit is provided, a valid/invalid bit, unlike in traditional art such as the MESI protocol mentioned in the Background which uses two bits with a write-back cache. Using a store-through L1 cache, there are no cast outs or retry pushes at that level. All store operations issued by the core are forwarded to the L2 cache regardless of whether they hit or miss. A store-through cache additionally simplifies the handling of a parity error—it can be treated as if the cache line is just invalid (for a parity error arising from either L1 directory 208 or entry array 210).

If a load request misses both the L1 cache and the L2 cache, then load queues 236 may be used at the L2 level as in the prior art. The use of load queues at the L2 level is not as critical as at the L1 level, since the L2 cache is much larger and so there are generally fewer misses. However, the present invention further contemplates extending the above-noted concept of providing a separate path for the critical (8-byte) data, to the system bus 105. One reload bus 222*b* is provided for the entire cache line, and is connected to multiplexer 226, while a separate register bus 238 having a smaller granularity is provided for the 8-bytes of data (and mirrored information). Reload buffers 239 may be used to write the cache line back to the L2 cache.

When a load request is issued, a pair of flags may be sent along with the request which specify which granularities are requested from the memory subsystem. The first granularity may be, e.g., 64 bytes, and the second granularity (which is a specific subset of the first granularity) may be, e.g., 8 bytes. If both granularities of data are to be returned to the requesting device, then the two granularities are returned in two separate bus transactions along system bus 105. The invention may support heterogenous devices on the system bus, i.e., wherein one device is not capable of receiving only the second granularity transaction. The requesting device could be an I/O device which may only be able to use the first granularity, in which case it sets the outbound flags to request only the first granularity. More particularly, the device may be a processing unit which includes at least one cache with cache lines having the first granularity, and a requested value having the second granularity is register data. When the cache issues a system bus address transaction due to a processor load request which missed in the cache, the cache may set the outbound flags to request only the second granularity, or the first granularity, or both granularities.

When the memory subsystem returns the requested data, the granularity of the data bus transaction may be determined by a pair of inbound flags. The first flag identifies the data as being of the first granularity of the second granularity. If both granularities were requested, the second (smaller) granularity is always returned with the first of two separate bus transactions. When the second granularity is returned (in the first bus transaction), the second flag indicates whether the first granularity (the second bus transaction) will occur or not. This approach allows the memory subsystem to imprecisely return the first granularity even though both granularities were requested.

If two (or more) L1 load misses are directed to the same cache line, then L2 controller 214 can collapse those multiple requests into a single load operation that is passed on to system bus 105. Two different sets of data are still mirrored back for the register renames (this situation presents another opportunity for imprecise operation of the L1 cache, i.e., not honoring one of the writes to the L1 cache, as discussed above).

Another novel aspect of the invention relates to store operations. If load/store unit 204 issues a store operation, it is passed down from register renames 206 to a store cache 240 in L2 cache 202. It also enters a queue 242 to the L1 cache, and a queue 244 to the L2 cache. Load requests always snoop against store queues 242 and 244, and these queues may be used to source the data when requested by another device, via a multiplexer having the queue entries as inputs. In the preferred embodiment, the store port is 8 bytes wide. If a store operation misses the L1 cache, and queue 242 is full, L1 cache 200 can simply ignore the store operation (as long as it always forwards the store operations to the L2 cache), without holding up the core (imprecise L1 allocation on L1 store misses). If a store operation hits the L1 cache and queue 242 is full, the L1 cache line can simply be invalidated and the store ignored without holding up the core (imprecise L1 update on L1 store hits). Again, the data will generally be written to the upper level cache whenever a determination is made that it would be efficient to do so.

This construction is distinct from the prior art which provided only a store queue. Store cache 240 is different from a queue in that, among other things, it includes an address directory as well as an entry array. Store cache 240 thus allows for "store gathering." In the prior art, if a processor does a one-byte store and misses the cache, the core is stalled until completion of a RWITM instruction. There may be other store operations following that instruction for the same line. The use of a store cache allows such related store operations to be gathered into a single operation for the entire line. In testing using DPC traces on a standard 172 million instruction reference set, this feature improved performance by resulting in only 6,000 stores stalling the core, as opposed to 24 million stores stalling the core on existing processors.

Figure 5:
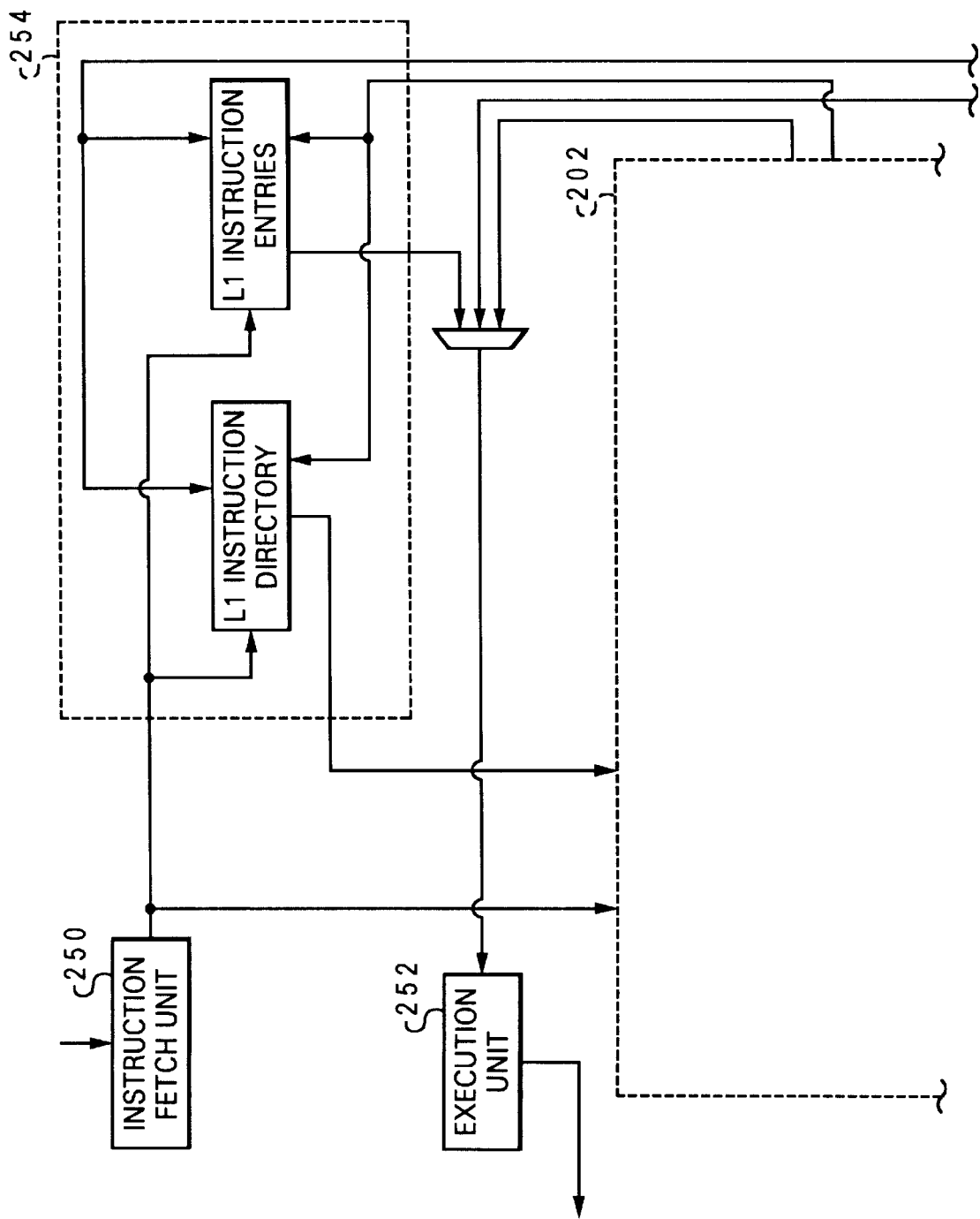
FIG. 5 is a block diagram of a processing unit constructed in accordance with another embodiment of the present invention, depicting operation of a cache structure which includes an L1 instruction cache.

While the foregoing description has been made with reference to the operand data cache 200, those skilled in the art will appreciate that the present invention may likewise be applied to an instruction cache. As shown in FIG. 5, an instruction fetch unit (IFU) 250 is allowed to issue fetch instructions to the L2 cache 202 without the use of intervening I-fetch reload queues. The feature is especially useful for issuing speculative instruction fetches. The fetch instruction, when passed down to the L2 cache, may include appropriate bits to indicate whether it was due to a real demand, or due to a speculative fetch (i.e., a predicted branch). The L2 cache is required to honor only the demand-based requests. In particular, the L2 cache might ignore non-demand requests that result in L2 misses. A sixteen-deep instruction buffer may be used for demanded instructions (8-byte) sent up by the L2 cache. Alternatively, the requested information may be directly ported to the appropriate execution unit 252 which was indicated as the target by the sequencer. Various feature described with reference to data cache 200 also apply to the instruction cache 254, such as a separate port for the critical requested 8-bytes, imprecise operation of the L1 instruction cache, control of L1 victimization using the L2 controller, etc.

Figure 6:
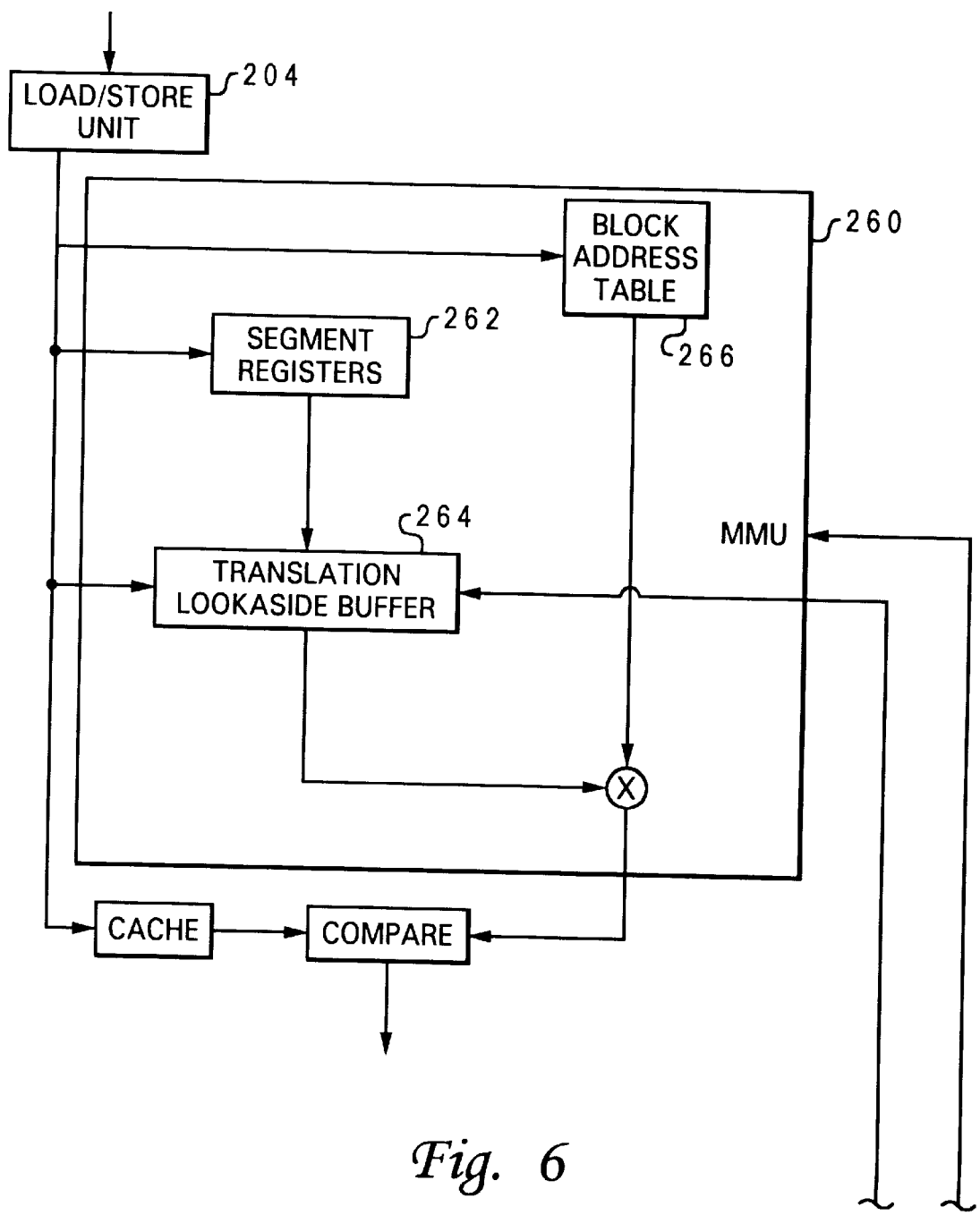
FIG. 6 is a block diagram of a memory management unit constructed in accordance with another embodiment of the present invention, depicting operation of a translation lookaside buffer for storing page table entries.

A further extension of the present invention similarly applies to translation caches, such as caches for a translation look aside buffer (TLB) or an effective-to-real address translation table (ERAT). For such implementations, the target data may be destined for components other than the register renames, i.e., execution units (adders) within the memory management unit using the TLB As shown in FIG. 6, the load/store unit 204 may further be connected to a memory management unit 260 utilized to translate effective addresses (EAs), specified within operand data access requests received from LSU 204, into physical addresses assigned to locations within system memory, and to translate EAs specified in memory mapped I/O requests into addresses of devices within the data processing system. In order to permit simultaneous address translation of operand data and instruction addresses, a corresponding address translation mechanism for instructions may be provided (not shown), i.e., for translating EAs contained within instruction requests, received from instruction fetch unit 250, into physical addresses with the system memory.

In the illustrative embodiment, MMU 260 includes segment registers 262 which are utilized to store segment identifiers for different subdivided regions of an effective address space of the processor. MMU 260 also includes a (data) translation look aside buffer (TLB) 264 which, in the preferred embodiment, is a two-way set associative cache for storing copies of recently accessed page table entries. MMU 260 further includes a block address table 266 which is used to translate EAs falling within predefined data blocks.

When an operand data access request is received from LSU 204, TLB 264 is examined to see if the effective address of the operand data is present. If so, the corresponding page table entry (PTE) found within TLB 264 is assigned to the request and used by MMU 260 to determine the physical address of the requested block (e.g., using a special adder that performs concatenation). However, if the requested EA is not present in TLB 264, then the PTE must be retrieved elsewhere, such as from the memory controller for the system memory device, via the system bus 105. As with the prior implementations, this request may be passed on to lower levels of the memory hierarchy along with use information but without requiring a higher level queue, and the requested PTE may be returned with the use information directly to MMU 260 (in parallel transmission to TLB 264) without the need for the higher level buffer, thereby enhancing performance of MMU 260 and hence improving the overall processing speed. Again, the other features described above may apply to the implementation for a translation cache.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the illustrative embodiment provides only vertical L1 and L2 cache levels for a single associated processor, the invention can be extended to additional cache levels as well, or to multi-processor systems, or to cache hierarchies having vertical caches that support a processor core cluster. It is therefore contemplated that such modifications can be made without departing from the spirit or scope of the present invention as defined in the appended claims.

What is claimed is:

1. A method of communicating with a multi-level cache of a computer system, comprising the steps of:
   issuing a request from a first device of the computer system to gain ownership of a target memory block located in a memory device of the computer system;
   determining that a copy of the target memory block is located in an upper level cache associated with a second device of the computer system;
   responding to the request by sending a null response from a lower level cache associated with the second device to the first device that acknowledges ownership of the target memory block by the first device, without any acknowledgement from the upper level cache; and
   updating a directory of the upper level cache using a lower level cache controller in response to said determining step, wherein said updating includes invalidating an entry in the upper level cache associated with the copy of the target memory block.

2. The method of claim 1 wherein the computer system is a multi-processor computer system, the first device is a first processor, the second device is a second processor, and said issuing step includes the step of transmitting the request from the first device to the lower level cache of the second processor across a system bus.

3. The method of claim 1 wherein said issuing step issues a kill instruction for the target memory block.

4. The method of claim 1 wherein said issuing step issues a flush instruction for the target memory block.

5. The method of claim 1 wherein said issuing step is performed in response to the further step of the first device carrying out a read-with-intent-to-modify instruction.

6. The method of claim 1 wherein said determining step includes the step of snooping the request by the lower level cache.

7. The method of claim 1 further comprising the step of maintaining inclusivity between the upper level and lower level caches, and wherein said determining step includes the further step of searching a directory of the lower level cache for an address associated with the request.

8. A computer system comprising:
   a system memory device;
   means for processing program instructions;
   means, connected to said processing means, for caching values stored in said system memory device, said caching means having at least an upper level cache and a lower level cache both associated with said processing means, wherein said lower level cache includes means for snooping a request to gain ownership of a target memory block located in said system memory device and means, responsive to a determination that a copy of the target memory block is located in said upper level cache, for responding to the request by sending a null response to a requesting device of the computer system that acknowledges ownership of the target memory block by the requesting device, without any acknowledgement from said upper level cache; and
   wherein said lower level cache further includes means, responsive to the determination that the copy of the target memory block is located in said upper level cache, for updating a directory of said upper level cache to invalidate an entry in said upper level cache associated with the copy of the target memory block.

9. The computer system of claim 8 wherein said upper level cache is an operand data cache.

10. The computer system of claim 8 wherein:
    said upper level cache is an L1 cache; and
    said lower level cache is an L2 cache.

11. The computer system of claim 8 wherein said upper level cache is a store-through cache.

12. The computer system of claim 8 wherein:
    said lower level cache maintains inclusivity with said upper level cache; and
    said lower level cache determines that the copy of the target memory block is located in said upper level cache by searching a directory of said lower level cache for an address associated with the request.

13. A cache for a data processing system, said cache comprising:
   means for snooping a request by a requesting device to gain ownership of a target memory block located in a system memory device;

means, responsive to a determination that a copy of the target memory block is located in an upper level cache coupled to said cache, for responding to the request by sending a null response to the requesting device, without any acknowledgement from said upper level cache; and means, responsive to the determination that the copy of the target memory block is located in said upper level cache, for updating a directory of said upper level cache to invalidate an entry in said upper level cache associated with the copy of the target memory block.

14. A processing system, comprising;

a processor;

a cache according to claim 13 at a lower level; and an upper level cache coupled to the processor and the cache at the lower level.

* * * * *